(12) United States Patent
Miao et al.

(10) Patent No.: US 9,345,002 B2
(45) Date of Patent: May 17, 2016

(54) DYNAMIC SPECTRUM ALLOCATION METHOD AND DEVICE BASED ON CHANNEL MANAGEMENT

(71) Applicant: ZTE Corporation, Shenzhen, Guangdong (CN)

(72) Inventors: Ting Miao, Shenzhen (CN); Yan Li, Shenzhen (CN); Xing Liu, Shenzhen (CN); Bin Wang, Shenzhen (CN); Dong Zhou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/381,278

(22) PCT Filed: Feb. 27, 2013

(86) PCT No.: PCT/CN2013/071951
§ 371 (c)(1),
(2) Date: Aug. 27, 2014

(87) PCT Pub. No.: WO2013/127341
PCT Pub. Date: Sep. 6, 2013

(65) Prior Publication Data
US 2015/0119059 A1  Apr. 30, 2015

(30) Foreign Application Priority Data

Feb. 27, 2012  (CN) .......................... 2012 1 0045528

(51) Int. Cl.
*H04W 72/00* (2009.01)
*H04W 72/04* (2009.01)
*H04W 16/10* (2009.01)

(52) U.S. Cl.
CPC .............. *H04W 72/04* (2013.01); *H04W 16/10* (2013.01)

(58) Field of Classification Search
CPC .......... H04W 72/04; H04W 16/10; H04B 7/04
See application file for complete search history.

(56) References Cited

U.S. PATENT DOCUMENTS

2010/0173586 A1* 7/2010 McHenry et al. ............... 455/62
2010/0240407 A1* 9/2010 Park et al. ...................... 455/512
(Continued)

FOREIGN PATENT DOCUMENTS

| CN | 101656998 A | 2/2010 |
| DE | 19625856 A1 | 9/1997 |
| WO | 2009031825 A2 | 3/2009 |

OTHER PUBLICATIONS

International Search Report in international application No. PCT/CN2013/071951, mailed on Jun. 6, 2013. (2 pages—see entire document).
English Translation of the Written Opinion of the International Search Authority in international application No. PCT/CN2013/071951, mailed on Jun. 6, 2013. (7 pages—see entire document).
(Continued)

*Primary Examiner* — Erin File
(74) *Attorney, Agent, or Firm* — Oppedahl Patent Law Firm LLC

(57) ABSTRACT

The present disclosure discloses a dynamic spectrum allocation method and device based on channel management. The method comprises the following steps: a network node generates a channel set according to an available channel list and channel classification information, and maintains and updates the channel set; and the network node selects a spectrum from the channel set and allocates the spectrum. The device comprises: a channel set generation module configured to generate a channel set according to an available channel list and channel classification information and maintain and update the channel set; and a spectrum allocation module configured to select a spectrum from the channel set and allocate the spectrum. The present disclosure can reduce the delay in the spectrum resource reconfiguration of a CR system, improves the overall performance of spectrum resource reconfiguration and increases the utilization efficiency of a spectrum.

17 Claims, 4 Drawing Sheets

(56) References Cited

U.S. PATENT DOCUMENTS

2010/0261423 A1 10/2010 Stanforth
2012/0302190 A1* 11/2012 McHenry .................. 455/226.3

OTHER PUBLICATIONS

Supplementary European Search Report in European application No. 13754233.8, mailed on Oct. 14, 2015.

* cited by examiner

DYNAMIC SPECTRUM ALLOCATION METHOD AND DEVICE BASED ON CHANNEL MANAGEMENT

TECHNICAL FIELD

The present disclosure relates to the field of wireless communication and cognitive radio, and more specifically to a dynamic spectrum allocation method and device based on channel management.

BACKGROUND

In a Cognitive Radio (CR) system, a wireless communication device having a cognitive function can use a licensed frequency band in a kind of 'opportunistic' manner on the premise of causing no interference to a licensed user, which greatly increases the utilization rate of spectrum and resolves the conflict between the increasing demand for wireless services and continuously scarcity of frequency resources. CR technologies allocate spectrum among systems dynamically, breaking through the conventional fixed spectrum allocation and increasing the utilization rate of spectrum. As one of core technologies of CR, dynamic spectrum allocation technology has become a research hotspot.

In CR, the sensing on a radio environment improves the management on radio resources and facilitates the monitoring on a network and the handling of a failure. Radio Environment Maps (REM) refer to a dynamic database which is capable of tracking the change of a radio environment and in which wireless related measurements of positioning information and network performance indicators are stored. Wireless related measurements include Reference Signal Receiving Power (RSRP)/Reference Signal Receiving Quality (RSRQ) measurement, interference level measurement and Quality of Service (QoS) measurement. REM assists in a CR decision.

Researches show that the current utilization rate of TV spectrum is not high, thus, CR can wait an opportunity to use a channel which is not used by a primary system (that is, a television broadcasting system) at a specific time at a specific position, that is, a Television White Space (TVWS); to protect the primary system from being interrupted by a secondary system (that is, a CR system), the distance between the transmitter of the secondary system using an idle spectrum of the primary system and the coverage edge of the primary system is greater than a certain value, and this value is the protection distance between the primary system and the secondary system. FIG. 1 is a diagram illustrating a system architecture for the use of a TVWS by a CR system according to the prior art, as shown in FIG. 1, the main network elements involved include: a Database (DB), a Central Control Point (CCP) and a Base Station (BS), wherein the DB contains information on the spectrum occupied by a primary user, information on the spectrums not occupied by the primary user and information on spectrums not allowed to be used; the CCP manages the access of a subordinate node to the TVWS and coordinates the allocation of the TVWS spectrum to the subordinate nodes; the CCP is fixedly connected with the DB to acquire TVWS spectrum information and synchronously fixedly or wirelessly connected with the BS; the BS having a reconfiguration function and a cognitive function is capable of changing or adjusting parameters (e.g. modulation type and transmitting power) of wireless communication technologies, managing and maintaining an operating spectrum (e.g. an operating frequency point and a bandwidth) and has a spectrum cognition capability and a cognitive data processing capability.

Typically, according to the prior art, in the dynamic spectrum allocation technology, a base station needing to apply for a spectrum resource applies for a spectrum resource from a CCP, the CCP requests a DB for the allocation of a spectrum and then coordinates the allocation of spectrum resources according to the requested spectrum resource and the spectrum use condition of subordinate nodes. During the dynamic spectrum allocation process, since every time the base station needing to apply for a spectrum resource sends a spectrum resource application, the CCP needs to access the DB and coordinate the allocation of a spectrum to the BS applying from a spectrum resource according to the spectrum use condition of subordinate nodes, it takes a certain time to complete the processing process, causing a delay in the allocation of the spectrum resources and consequentially leading to a delay in the reconfiguration of spectrum resources.

A channel management method is proposed in the IEEE802.22 Wireless Regional Area Networks (RWAN) protocol according to which available channel list (that is, a set of channels potentially available to a secondary system provided by a DB according to the position of the secondary system) are divided into six types of channel sets: a set of channels not allowed to be used, a set of operating channels, a set of backup channels, a set of candidate channels, a set of protected channels and an unclassified channels. The channel not allowed to be used refers to a channel not allowed to be used by the secondary system for the sake of a service requirement or the restriction of a local rule; the operating channel refers to the current channel used for the communication of a BS in a WRAN cell with Customer Premise Equipments (CPEs); the backup channel refers to a channel which can function as an operating channel at any time if needed; the candidate channel refers to a channel which can function as a backup channel (the possibility that a candidate channel can function as a backup channel is evaluated by sensing the candidate channel); the protected channel refers to a channel which is being used by a primary user or a WRAN user according to a sensing result; and the unclassified channel refers to a channel that has not been sensed which can be determined as a candidate channel or protected channel according to a sensing result. Different channel sets have different sensing periods, by defining channel sets, a channel can be selected from a set of backup channels when a secondary system needs a spectrum so that the secondary system can use an idle spectrum not used by a primary system on the premise of causing no interference to the primary system. The channel classification method takes into consideration of the occupation status of channels, regulatory constraints and the quality status of channels, however, secondary systems different in configuration and providing different services have different requirements on spectrum, for example, if secondary systems have different requirements on transmitting parameter and the quality of service (QoS), they will have different requirements on spectrum, in addition, the natural isolators existing in the radio environment of a secondary system, for example, the high buildings or mountains located on the coverage edge of the base station of a secondary system, also cause influence on the spectrum selection of the secondary system. The channel set management taking no consideration of these factors degrades the quality of service after reconfiguration and even leads to a failed reconfiguration.

To address the foregoing problems existed in the prior art, a dynamic spectrum allocation method is proposed in the present disclosure.

SUMMARY

In view of the problems above, the present disclosure provides a dynamic spectrum allocation method and device based on channel management to address to the technical problems of a great spectrum allocation delay in spectrum resource reconfiguration, the low overall performance of spectrum resource reconfiguration and the low spectrum utilization efficiency.

The technical solution of the present disclosure is realized as follows:

a dynamic spectrum allocation method based on channel management includes:

a network node generates a channel set according to an available channel list and channel classification information and maintains and updates the channel set; and the network node selects a spectrum from the channel set and allocates the spectrum.

Preferably, the network node is a BS or a CCP, and in the case where the network node is a CCP, the CCP selects a spectrum from the channel set and allocates the spectrum for the BS.

Preferably, the available channel list is acquired by the network node from a DB in which primary user related spectrum information is stored.

Preferably, the channel classification information includes one or more of the following items: a channel quality status, a channel idle time, limitations on channel transmitting parameters, the geographical isolation of a channel and a channel spectrum frequency.

Preferably, the channel quality status is a quantity capable of reflecting the quality of a useful signal received by a receiver when a secondary system uses the idle spectrum of a primary system.

The channel idle time refers to the time span from a specific moment to the moment of the reuse of a channel by the primary system.

The limitations on channel transmitting parameters include one or more of the following items: a limitation on the maximum transmitting power, a limitation on an adjacent channel leakage power ratio, a limitation on stray radiation and a limitation on the maximum channel-allowed interference level.

The geographical isolation of a channel refers to the natural isolator existing in a radio environment and/or the distance between the transmitter of the secondary system and the coverage edge of the primary system.

The channel spectrum frequency refers to the start frequency, the stop frequency or the center frequency of a channel spectrum.

Preferably, generating a channel set according to an available channel list and channel classification information specifically includes:

generating a channel set according to an available channel list and a channel quality status, dividing the channel quality status into N ranges, wherein N is a positive integer, and dividing the available channel list into N channel sets according to the ranges the channel quality status of the channels in the available channel list belong to; or generating a channel set according to an available channel list and a channel idle time, dividing the channel idle time into N ranges, wherein N is a positive integer, and dividing the available channel list into N channel sets according to the ranges the channel idle time of the channels in the available channel list belong to; or generating a channel set according to an available channel list and the geographical isolation of a channel, dividing the geographical isolation of a channel into N ranges, and dividing the available channel list into N channel sets according to the ranges the geographical isolation of a channel in the available channel list belong to; or generating a channel set according to an available channel list and the limitations on channel transmitting parameters, dividing an item in the limitations on channel transmitting parameters into N ranges, wherein N is a positive integer, and dividing the available channel list into N channel sets according to the ranges the corresponding item in the limitations on channel transmitting parameters of the channels in the available channel list belong to; or generating a channel set according to an available channel list and a channel spectrum frequency, dividing the channel spectrum frequency into N ranges, wherein N is a positive integer, and dividing the available channel list into N channel sets according to the ranges the channel spectrum frequency of the channels in the available channel list belong to; or generating N channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographical isolation of a channel and a channel spectrum frequency, wherein N is a positive integer.

Preferably, each BS corresponds to N channel sets.

Preferably, generating a channel set according to an available channel list and channel classification information specifically includes:

generating a channel set according to an available channel list and a channel quality status, and dividing the channel quality status into 2 ranges, that is, determining a channel quality threshold, wherein the channels in the available channel list the channel quality of which is below the threshold form a channel set 1, and the channels in the available channel list the channel quality of which is equal to or greater than the threshold form a channel set 2; or generating a channel set according to an available channel list and a channel idle time, and dividing the channel idle time into 2 ranges, that is, determining a channel idle time threshold, wherein the channels in the available channel list the channel idle time of which is below the threshold form a channel set 1, and the channels in the available channel list the channel idle time of which is equal to or greater than the threshold form a channel set 2; or generating a channel set according to an available channel list and the limitations on channel transmitting parameters, and dividing an item in the limitations on channel transmitting parameters into 2 ranges, that is, determining a threshold for a corresponding item in the limitations on channel transmitting parameters, wherein the channels in the available channel list the corresponding item of which in the limitations on channel transmitting parameters is below the threshold form a channel set 1, and the channels in the available channel list the corresponding item of which in the limitations on channel transmitting parameters is equal to or greater than the threshold form a channel set 2; or generating a channel set according to an available channel list and the geographical isolation of a channel, and dividing the geographical isolation of a channel into 2 ranges, that is, determining a threshold for the geographical isolation of a channel, wherein the channels in the available channel list the geographical isolation of which is below the threshold form a channel set 1, and the channels in the available channel list the geographical isolation of which is equal to or greater than the threshold form a channel set 2; or generating a channel set according to an available channel list and a channel spectrum frequency, and dividing the channel spectrum frequency into 2 ranges, that is, determining a channel spectrum frequency threshold, wherein the channels in the available channel list the channel spectrum frequency of which is below the threshold form a channel set 1, and the channels in the available channel list the channel spectrum frequency of which is equal to or greater than the threshold form a channel set 2; or generating channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency and determining a threshold for each of the two or more items to obtain threshold combinations of the two or more items, and forming the channel set with the channels in the available channel list belonging to the same threshold combination.

Preferably, the method further includes: the network node ranks the priorities of the channels in the channel set according to the channel quality status and/or the priorities of the channels in an adjacent BS channel set.

Preferably, the process that the network node selects a spectrum from the channel set and allocates the spectrum specifically includes:

when a channel set is generated according to an available channel list and the channel quality status, selecting a channel from a channel set meeting the requirement of a base station on channel quality;

when a channel set is generated according to an available channel list and the channel idle time, selecting a channel from a channel set meeting the requirement of a base station on channel idle time;

when a channel set is generated according to an available channel list and limitations on channel transmitting parameters, selecting a channel from a channel set meeting the requirement of a base station on channel transmitting parameters;

when a channel set is generated according to an available channel list and the geographical isolation of a channel, selecting a channel from a channel set meeting the requirement of a base station on the geographical isolation of a channel;

when a channel set is generated according to an available channel list and the channel spectrum frequency, selecting a channel from a channel set meeting the requirement of a base station on a channel spectrum frequency; and when a channel set is generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, selecting a channel from a channel set meeting the requirement of a base station on the two or more items.

A dynamic spectrum allocation device based on channel management includes:

a channel set generation module configured to generate a channel set according to an available channel list and channel classification information and maintain and update the channel set; and a spectrum allocation module configured to select a spectrum from the channel set and allocate the spectrum.

Preferably, the device is located at a BS or a CCP.

Preferably, the channel classification information serving as a basis for the channel generation module to generate a channel set includes one or more of the following items: a channel quality status, a channel idle time, limitations on channel transmitting parameters, the geographical isolation of a channel and a channel spectrum frequency.

Preferably, the channel quality status is a quantity capable of reflecting the quality of a useful signal received by a receiver when a secondary system uses the idle spectrum of a primary system;

the channel idle time refers to the time span from a specific moment to the moment of the reuse of a channel by the primary system;

the limitations on channel transmitting parameters include one or more of the following items: a limitation on the maximum transmitting power, a limitation on an adjacent channel leakage power ratio, a limitation on stray radiation and a limitation on the maximum channel-allowed interference level;

the geographical isolation of a channel refers to the natural isolator existing in a radio environment and/or the distance between the transmitter of the secondary system and the coverage edge of the primary system; and the channel spectrum frequency refers to the start frequency, the stop frequency or the center frequency of a channel spectrum.

Preferably, the channel set generation module generates a channel set according to an available channel list and a channel quality status, divides the channel quality status into N ranges, wherein N is a positive integer, and divides the available channel list into N channel sets according to the ranges the channel quality status of the channels in the available channel list belong to; or the channel set generation module generates a channel set according to an available channel list and a channel idle time, divides the channel idle time into N ranges and divides the available channel list into N channel sets according to the ranges the channel idle time of the channels in the available channel list belong to; or the channel set generation module generates a channel set according to an available channel list and the geographical isolation of a channel, divides the geographical isolation of a channel into N ranges, and divides the available channel list into N channel sets according to the ranges the geographical isolation of the channels in the channel list belong to; or the channel set generation module generates a channel set according to an available channel list and the limitations on channel transmitting parameters, divides an item in the limitations on channel transmitting parameters into N ranges, and divides the available channel list into N channel sets according to the ranges the corresponding item in the limitations on channel transmitting parameters of the channels in the available channel list belong to; or the channel set generation module generates a channel set according to an available channel list and a channel spectrum frequency, divides the channel spectrum frequency into N ranges, and divides the available channel list into N channel sets according to the ranges the channel spectrum frequency of the channels in the available channel list belong to; or the channel set generation module generates N channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency.

N is a positive integer, and preferably, each BS corresponds to N channel sets.

Preferably, the channel set generation module generates a channel set according to an available channel list and a channel quality status and divides the channel quality status into 2 ranges, that is, determines a channel quality threshold, wherein the channels in the available channel list the channel quality of which is below the threshold form a channel set 1, and the channels in the available channel list the channel quality of which is equal to or greater than the threshold form a channel set 2; or the channel set generation module generates a channel set according to an available channel list and a channel idle time and divides the channel idle time into 2 ranges, that is, determines a channel idle time threshold, wherein the channels in the available channel list the channel idle time of which is below the threshold form a channel set 1, and the channels in the available channel list the channel idle time of which is equal to or greater than the threshold form a channel set 2; or the channel set generation module generates a channel set according to an available channel list and the limitations on channel transmitting parameters and divides an item in the limitations on channel transmitting parameters into 2 ranges, that is, determines a threshold for a corresponding item in the limitations on channel transmitting parameters, wherein the channels in the available channel list the corresponding item of which in the limitations on channel transmitting parameters is below the threshold form a channel set 1, and the channels in the available channel list the corresponding item of which in the limitations on channel transmitting parameters is equal to or greater than the threshold form a channel set 2; or the channel set generation module generates a channel set according to an available channel list and the geographical isolation of a channel and divides the geographical isolation of a channel into 2 ranges, that is, determines a threshold for the geographical isolation of a channel, wherein the channels in the available channel list the geographical isolation of which is below the threshold form a channel set 1, and the channels in the available channel list the geographical isolation of which is equal to or greater than the threshold form a channel set 2; or the channel set generation module generates a channel set according to an available channel list and a channel spectrum frequency and divides the channel spectrum frequency into 2 ranges, that is, determines a channel spectrum frequency threshold, wherein the channels in the available channel list the channel spectrum frequency of which is below the threshold form a channel set 1, and the channels in the available channel list the channel spectrum frequency of which is equal to or greater than the threshold form a channel set 2; or the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, determines a threshold for each of the two or more items to obtain threshold combinations of the two or more items, and forms a channel set with the channels in the available channel list belonging to the same threshold combination.

Preferably, the channel set generation module ranks the priorities of the channels in the channel set according to the channel quality status and/or the priorities of the channels in an adjacent BS channel set.

Preferably, when the channel set generation module generates a channel set according to an available channel list and a channel quality status, the spectrum allocation module selects a channel from a channel set meeting the requirement of a BS on channel quality;

when the channel set generation module generates a channel set according to an available channel list and a channel idle time, the spectrum allocation module selects a channel from a channel set meeting the requirement of a BS on channel idle time;

when the channel set generation module generates a channel set according to an available channel list and the limitations on channel transmitting parameters, the spectrum allocation module selects a channel from a channel set meeting the requirement of a BS on channel transmitting parameters;

when the channel set generation module generates a channel set according to an available channel list and the geographical isolation of a channel, the spectrum allocation module selects a channel from a channel set meeting the requirement of a BS on the geographical isolation of a channel;

when the channel set generation module generates a channel set according to an available channel list and a channel spectrum frequency, the spectrum allocation module selects a channel from a channel set meeting the requirement of a BS on the channel spectrum frequency; and when the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, the spectrum allocation module selects a channel from a channel set meeting the requirement of a BS on the two or more items.

The dynamic spectrum allocation method based on channel management provided herein systemically describes the generation and the maintenance and update of a channel set in a CR system as well as the dynamic allocation of a spectrum, and the present disclosure reduces the delay in the spectrum resource reconfiguration of a CR system, improves the overall performance of spectrum resource reconfiguration and increases the utilization efficiency of a spectrum.

DETAILED DESCRIPTION

With the technical solution of the present disclosure, the delay in spectrum allocation is reduced, the overall performance of spectrum resource reconfiguration is improved and the utilization rate of a spectrum is increased by generating, maintaining and updating a channel set by a network node and selecting a spectrum from the channel set and allocating the spectrum to a BS by the network node.

Figure 1:
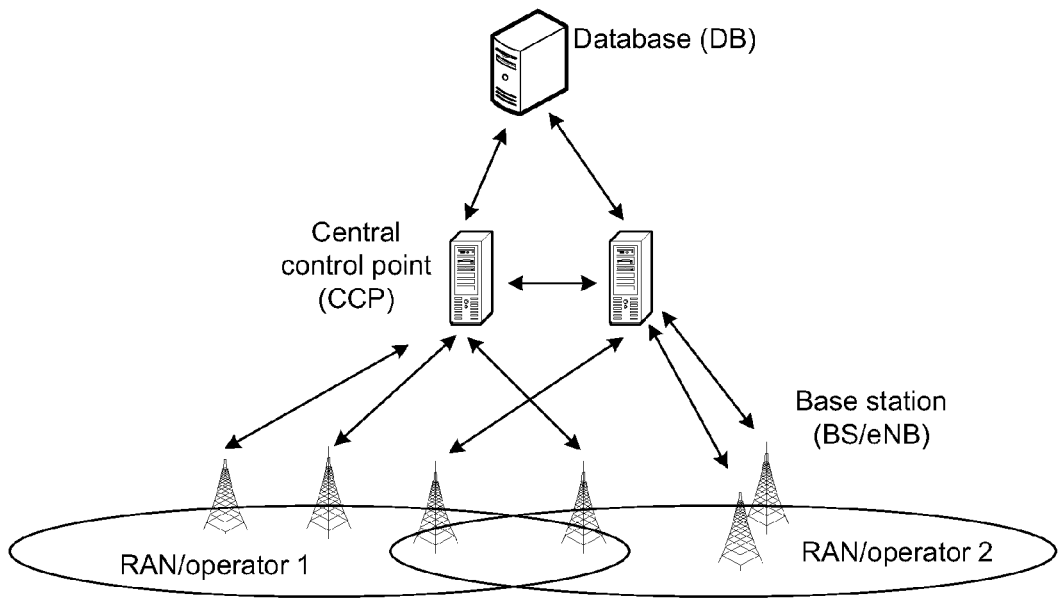
FIG. 1 illustrates a system architecture.
Figure 2:
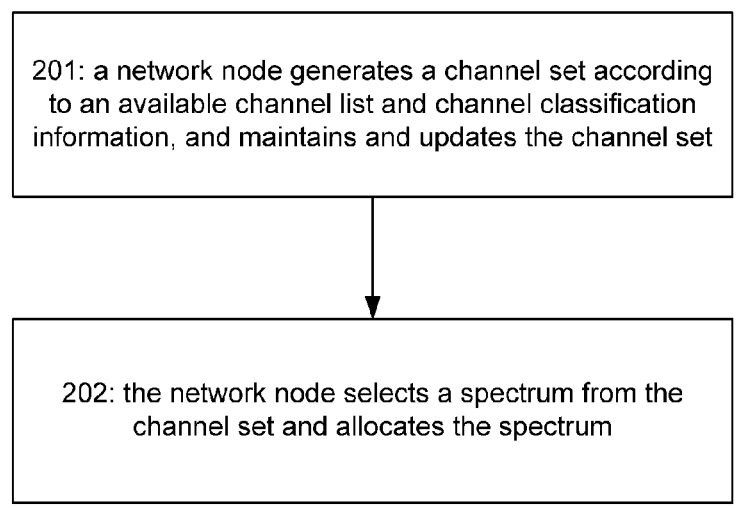
FIG. 2 illustrates the flow of the dynamic spectrum allocation method based on channel management disclosed herein.

FIG. 2 illustrates the flow of the dynamic spectrum allocation method based on channel management disclosed herein, the method includes the following Steps:

Step 201: a network node generates a channel set according to an available channel list and channel classification information and maintains and updates the channel set.

The network node includes an optional one of: a BS and a CCP.

The available channel list is acquired by the network node from a DB in which primary user related spectrum information is stored.

Preferably, the available channel list can be acquired in the following ways:

(1) when the network node is a BS, the BS provides the geographic position information thereof and the identifier information thereof (the radio frequency requirement, including the minimum transmitting power, the out-of-band radiation and the spray radiation, of the BS can be known according to the identifier information of the BS) to an upper node (CCP), the upper node of the BS sends the geographic position information and the identifier information of the BS and/or the identifier thereof to a DB, the DB calculates an available channel list meeting the requirement of the BS according to the geographic position information and the identifier information of the BS and feeds back the available channel list to the upper node of the BS, and then the upper node of the BS obtains the available channel list of the BS according to the available channel list acquired from the DB and those of other subordinate BSs and sends the obtained available channel list to the BS.

(2) when the network node is a BS, the BS provides the geographic position information thereof to an upper node (CCP), the upper node of the BS sends the geographic position information provided by the BS and/or the identifier thereof to a DB, the DB feeds back an available channel list of the BS to the upper node of the BS according to the geographic position information of the BS, sequentially, the upper node of the BS obtains available channel lists of the BS according to the available channel list acquired from the DB and those of other subordinate BSs and sends the obtained available channel lists to the BS, and the BS selects an available channel list meeting the radio frequency requirement thereof from the available channel lists;

(3) when the network node is a CCP, the BS provides the geographic position information thereof and the identifier information thereof (the radio frequency requirement, including the minimum transmitting power, the out-of-band radiation and the spray radiation, of the BS can be known according to the identifier information of the BS) to an upper node (CCP), the upper node of the BS sends the geographic position information and the identifier information provided by the BS and/or the identifier thereof to a DB, the DB calculates an available channel list meeting the requirement of the BS according to the geographic position information and the identifier information of the BS and feeds back the available channel list to the upper node of the BS, and then the upper node of the BS obtains the available channel list of the BS according to the available channel list acquired from the DB and those of other subordinate BSs.

(4) when the network node is a CCP, the BS provides the geographic position information thereof and the identifier information thereof (the radio frequency requirement, including the minimum transmitting power, the out-of-band radiation and the spray radiation, of the BS can be known according to the identifier information of the BS) to an upper node (CCP), the upper node of the BS sends the geographic position information of the BS and/or the identifier of the upper node to a DB, the DB feeds back an available channel list of the BS to the upper node of the BS according to the geographic position information of the BS, obtains available channel lists of the BS according to the available channel list acquired from the DB and those of other subordinate BSs, and then selects an available channel list meeting the radio frequency requirements of the BS from the available channel lists.

The channel classification information includes one or more of the following items: a channel quality status, a channel idle time, limitations on channel transmitting parameters, the geographical isolation of a channel and a channel spectrum frequency.

The channel quality status is a quantity capable of reflecting the quality of a useful signal received by a receiver when a secondary system uses the idle spectrum of a primary system, a network node can acquire the channel quality status through the measurement of a secondary device or from REM information, and the channel quality status can be represented with a performance index, for example, a Signal to Noise Ratio (SNR) or a bit error ratio, of a channel; the channel idle time refers to the time span from a specific moment to the moment of the reuse of a channel by the primary system, a network node may statistically evaluate channel idle time according to a record on previous channel idle time or acquire channel idle time from a DB; the limitations on channel transmitting parameters include the limitation on one or more of the following items: maximum transmitting power, adjacent channel leakage power ratio, stray radiation and maximum channel-allowed interference level; the geographical isolation of a channel refers to the natural isolator existing in a radio environment and/or the distance between the transmitter of the secondary system and the coverage edge of the primary system, the network node can acquire the geographical isolation of a channel from a DB or REM information; and the channel spectrum frequency refers to the start frequency, the stop frequency or the center frequency of a channel spectrum, and the network node acquires the channel spectrum frequency from a DB.

The limitation on the maximum transmitting power, the limitation on an adjacent channel leakage power ratio and the limitation on stray radiation, which refer to upper limits of the radio frequency parameters (that is, corresponding maximum transmitting power, adjacent channel leakage power ratio and spray radiation) of the secondary system when the secondary system uses an idle channel of the primary system, can be calculated by a DB and acquired by the network node from the DB or calculated by the network node; the maximum channel-allowed interference level limitation, which refers to the upper limit of an interference level allowable to the primary system when the secondary system uses an idle channel of the primary system, can be acquired from the DB by the network node.

Generating a channel set by the network node specifically includes: when a channel set is generated according to an available channel list and a channel quality status, dividing a channel quality status into N ranges (N is a positive integer) and dividing an available channel list into N channel sets according to the ranges the channel quality status of the channels in the available channel list belong to; when the channel set is generated according to the available channel list and channel idle time, dividing a channel idle time into N ranges and dividing an available channel list into N channel sets according to the ranges the channel idle time of the channels in the available channel list belong to; when the channel set is generated according to the available channel list and the limitations on channel transmitting parameters, dividing an item in limitations on channel transmitting parameters into N ranges and dividing an available channel list into N channel sets according to the ranges the corresponding item of the limitations on channel transmitting parameters of the channels in the available channel list belong to; when the channel set is generated according to the available channel list and the geographical isolation of a channel, dividing the geographical isolation of a channel into N ranges and dividing an available channel list into N channel sets according to the ranges the geographical isolation of the channels in the channel list belong to; and when the channel set is generated according to the available channel list and channel spectrum frequency, dividing a channel spectrum frequency into N ranges and dividing an available channel list into N channel sets according to the ranges the channel spectrum frequency of the channels in the available channel list belong to.

Preferably, N channel sets may be generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency.

Preferably, each BS corresponds to N channel sets.

Preferably, when a channel set is generated according to an available channel list and a channel quality status, the channel quality status is divided into 2 ranges, that is, a channel quality threshold is determined, the channels in the available channel list the channel quality of which is below the threshold form a channel set 1, and the channels in the available channel list the channel quality of which is equal to or greater than the threshold form a channel set 2.

Preferably, when a channel set is generated according to an available channel list and a channel idle time, the channel idle time is divided into 2 ranges, that is, a channel idle time threshold is determined, wherein the channels in the available channel list the channel idle time of which is below the threshold form a channel set 1, and the channels in the available channel list the channel idle time of which is equal to or greater than the threshold form a channel set 2.

Preferably, when a channel set is generated according to an available channel list and the limitations on channel transmitting parameters, an item in the limitations on channel transmitting parameters is divided into 2 ranges, that is, a threshold is determined for a corresponding item in the limitations on channel transmitting parameters, wherein the channels in the available channel list the corresponding item of which in the limitations on channel transmitting parameters is below the threshold form a channel set 1, and the channels in the available channel list the corresponding item of which in the limitations on channel transmitting parameters is equal to or greater than the threshold form a channel set 2.

Preferably, when a channel set is generated according to an available channel list and the geographical isolation of a channel, the geographical isolation of a channel is divided into 2 ranges, that is, a threshold is determined for the geographical isolation of a channel, wherein the channels in the available channel list the geographical isolation of which is below the threshold form a channel set 1, and the channels in the available channel list the geographical isolation of which is equal to or greater than the threshold form a channel set 2.

Preferably, when a channel set is generated according to an available channel list and a channel spectrum frequency, the channel spectrum frequency is divided into 2 ranges, that is, a channel spectrum frequency threshold is determined, wherein the channels in the available channel list the channel spectrum frequency of which is below the threshold form a channel set 1, and the channels in the available channel list the channel spectrum frequency of which is equal to or greater than the threshold form a channel set 2;

Preferably, when channel sets are generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, a threshold for each of the two or more items is determined to obtain threshold combinations of the two or more items, and a channel set is formed by the channels in the available channel list belonging to the same threshold combination.

Preferably, a network node also further rank the priorities of the channels in the channel set according to the channel quality status and/or the priorities of the channels in an adjacent BS channel set.

Maintaining and updating the channel set specifically includes: the network node maintains and updates the channel set periodically or under the trigger of an event according to a spectrum sensing measurement result and/or DB information and/or REM information and/or a command from a monitoring domain. The maintenance and update includes: deleting a channel not meeting a channel set condition or adding a channel meeting a channel set condition to a channel set.

The command from a monitoring domain refers to a command sent from the monitoring domain to a cognitive system to indicate an exit from a given frequency band, when the monitoring domain reserves a certain or some frequency bands for a certain service according to a temporary planning or when the cognitive system is forbidden to use a certain or some frequency bands due to local regulations, the monitoring domain needs to send a command to the cognitive system to inform the cognitive system to exit the certain frequency band.

Step 202: the network node selects a spectrum from the channel set and allocates the spectrum.

The event triggering the allocation of a spectrum includes one or more of the following situations: a primary user appears on the idle spectrum of the primary system being used by the CR system; the use of the idle spectrum of the primary system by the CR system causes interference to the primary user; a command is received from the monitoring domain which indicates an exit from an idle spectrum being used by the CR system; and the current load of the CR system is heavy or the communication quality of the CR system is poor.

When any of the situations occurs, the network node allocates a spectrum specifically in the following way: in the case where the network node is a BS, when a channel set is generated according to an available channel list and a channel quality status, the BS selects a channel from a channel set meeting a channel quality requirement according to the requirement of the BS on channel quality; when a channel set is generated according to an available channel list and a channel idle time, selects a channel from a channel set meeting a channel idle time requirement according to the requirement of the BS on channel idle time; when a channel set is generated according to an available channel list and limitations on channel transmitting parameters, selects a channel from a channel set meeting the requirement of the BS on channel transmitting parameters; when a channel set is generated according to an available channel list and the geographical isolation of a channel, selects a channel from a channel set meeting the requirement of the BS on the geographical isolation of a channel; when a channel set is generated according to an available channel list and a channel spectrum frequency, selects a channel from a channel set meeting the requirement of the BS on a channel spectrum frequency; and when a channel set is generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, selects a channel from a channel set meeting the requirement of a base station on the two or more items.

When any of the situations occurs, the network node allocates a spectrum specially in the following way: in the case where the network node is a CCP, when a channel set is generated according to an available channel list and a channel quality status, the BS applies for a spectrum from the CCP according to the requirement thereof on channel quality, and the CCP selects a channel from a channel set meeting the requirement on channel quality and allocates the selected channel to the BS; when a channel set is generated according to an available channel list and a channel idle time, the BS applies for a spectrum from the CCP according to the requirement thereof on channel idle time, and the CCP selects a channel from a channel set meeting the requirement on channel idle time and allocates the selected channel to the BS; when a channel set is generated according to an available channel list and limitations on channel transmitting parameters, the BS applies for a spectrum from the CCP according to the requirement thereof on channel transmitting parameters, and the CCP selects a channel from a channel set meeting the requirements on channel transmitting parameters and allocates the selected channel to the BS; when a channel set is generated according to an available channel list and the geographical isolation of a channel, the BS applies for a spectrum from the CCP according to the requirement thereof on the geographical isolation of a channel, and the CCP selects a channel from a channel set meeting the requirement on the geographical isolation of a channel and allocates the selected channel to the BS; when a channel set is generated according to an available channel list and a channel spectrum frequency, the BS applies for a spectrum from the CCP according to the requirement thereof on a channel spectrum frequency, and the CCP selects a channel from a channel set meeting the requirement on a channel spectrum frequency and allocates the selected channel to the BS; and when a channel set is generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, the BS applies for a spectrum from the CCP according to the requirement thereof on the two or more optional foregoing items, and the CCP selects a channel from a channel set meeting the requirements of a BS and allocates the selected channel to the BS.

Preferably, when there is no channel set meeting the requirement of the BS on a channel or no proper channel is selected, the upper node (e.g. CCP) of the BS coordinates the spectrum allocation of each subordinate BS.

It should be noted that the network nodes mentioned in Steps 201 and 202 are the same node.

Embodiment 1

Figure 3:
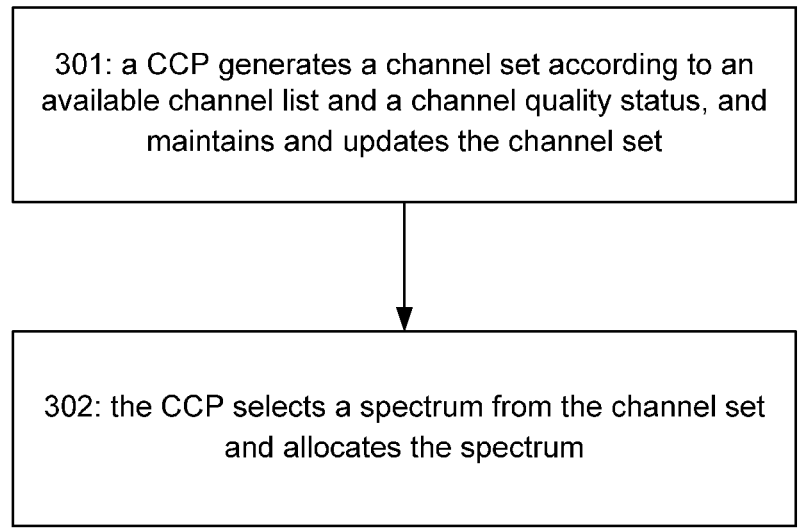
FIG. 3 illustrates the flow of a dynamic spectrum allocation method based on channel management according to embodiment 1.

FIG. 3 illustrates the flow of a dynamic spectrum allocation method based on channel management according to embodiment 1. In the method, a CCP generates a channel set according to an available channel list and channel quality status. The method includes the following steps:

Step 301: a CCP generates a channel set according to an available channel list and a channel quality status and maintains and updates the channel set.

In this step, the available channel list can be acquired by the CCP from a DB in the following way:

a BS provides the geographic position information thereof and the identifier information thereof (the radio frequency requirement of the BS, including the minimum transmitting power, the out-of-band radiation and the spray radiation of the BS, can be known according to the identifier information of the BS) to the CCP to which the BS belongs, the CCP sends the information provided by the BS and the identifier thereof to a DB, the DB calculates an available channel list meeting the requirement of the BS according to the geographic position and the identifier information of the BS and feeds back the available channel list to the CCP, and then the CCP obtains the available channel list of the BS according to the available channel list acquired from the DB and those of other subordinate BSs.

Here, the CCP may obtain the available channel list in another way, but is not limited to acquire the available channel list in only one way, for example, the BS provides the geographic position information and the identifier information thereof (the radio frequency requirement, including the minimum transmitting power, the out-of-band radiation and the spray radiation, of the BS can be known according to the identifier information of the BS) to the CPP to which the BS belongs, the CCP sends the geographic position information of the BS and the identifier thereof to a DB, the DB feeds back an available channel list of the BS to the CCP according to the geographic position information of the BS, the CCP obtains available channel lists of the BS according to the available channel list acquired from the DB and those of other subordinate BSs, and then selects an available channel list from the available channel lists meeting the requirement of the BS according to the radio frequency requirement of the BS.

The channel quality status is a quantity capable of reflecting the quality of a useful signal received by a receiver when a secondary system uses the idle spectrum of a primary system. The CCP may acquire the channel quality status through the measurement of a secondary device or from REM information; and the channel quality status may be represented with a performance index, such as the SNR or the bit error rate, of a channel.

The process that the CCP generates a channel set according to an available channel list and a channel quality status specifically includes: dividing the channel quality status into N (N is a positive integer) ranges, dividing the available channel list into N channel sets according to the ranges the channel quality status of the channels in the available channel list belong to, for example, if channel quality is represented by SNR, then the CCP divides SNR into N ranges: $(-\infty, SNR_1)1, [SNR_1, SNR_2)2, \ldots, [SNR_{N-1}, +\infty)N$, in which $SNR_1<SNR_2<SNR_3\ldots<SNR_{N-1}$, when the SNR of a channel in the available channel list belongs to the Kth set $[SNR_{k-1}, SNR_k)k$, then the channel belongs to the channel set k.

Preferably, each BS corresponds to N channel sets.

Preferably, the channel quality status is divided into two ranges, that is, an SNR threshold is determined, the channels in the available channel list the SNR of which is below the threshold form a channel set 1, and the channels in the available channel list the SNR of which is greater than or equal to the threshold form a channel set 2, for example, assume that the SRN threshold is 30 dB, if the SNR of a channel in the available channel list belongs to $(-\infty, 30\text{ dB})1$, then the channel belongs to the channel set 1, and if the SNR of a channel in the available channel list belongs to $[30\text{ dB}, +\infty)2$, then the channel belongs to the channel set 2.

Preferably, the CCP also ranks the priorities of the channels in the channel set according to the channel quality status and/or the priorities of the channels in an adjacent BS channel set. Specifically, the higher the quality of a channel is, the higher the priority of the channel is; the higher the priority of a channel in an adjacent BS channel set is, the lower the priority of the channel in the current BS is.

Maintaining and updating the channel set specifically includes: the CCP maintains and updates the channel set periodically or under the trigger of an event according to a spectrum sensing measurement result and/or DB information and/or REM information and/or a command from a monitoring domain. The maintenance and update includes: deleting a channel not meeting a channel set condition or adding a channel meeting a channel set condition to a channel set; specifically, taking the generation of two channels as an example, assume that before an update, the channel set 1 is {channel 1, channel 2}, the channel set 2 is {channel 3, channel 4} and the SNRs of channels 1 to 4 are 25 dB, 24 dB, 35 dB and 30 dB and then changed to 24 dB, 33 dB, 25 dB and 30 dB, after the update, channel set 1 becomes {channel 1, channel 3} and the channel set 2 becomes {channel 2, channel 4}. The priority of each channel in the channel set is ranked according to the SNR of the channel, then the finally obtained channel set 1 is {channel 3, channel 1} and the finally obtained channel set 2 is {channel 2, channel 4}.

The command from a monitoring domain refers to a command sent from the monitoring domain to a cognitive system to indicate an exit from a given frequency band, when the monitoring domain reserves a certain or some frequency bands for a certain service according to a temporary planning or when the cognitive system is forbidden to use a certain or some frequency bands due to local regulations, the monitoring domain needs to send a command to the cognitive system to inform the cognitive system to exit the certain frequency band.

Step 302: the CCP selects a spectrum from the channel set and allocates the spectrum.

The event triggering the allocation of a spectrum includes one or more of the following situations: a primary user appears on the idle spectrum of the primary system being used by the CR system; the use of the idle spectrum of the primary system by the CR system causes interference to the primary user; a command is received from the monitoring domain which indicates an exit from an idle spectrum being used by the CR system; and the current load of the CR system is heavy or the communication quality of the CR system is poor.

When any of the foregoing cases occurs, the CCP allocates a spectrum specifically in the following way: the BS applies for a spectrum from the CCP according to the requirement thereof on channel quality, the CCP selects a channel from a channel set meeting the requirement on channel quality and allocates the channel to the BS, specifically, by taking the generation of two channel sets as an example, when the BS needs to provide a service highly required in QoS, for example, a service the SNR of which is greater than or equal to 30 dB, then the CCP selects a channel starting from the channels in the channel set 2 higher in priority, and when the BS needs to provide a service not highly required in QoS, the CCP selects a channel from the channel set 1.

Preferably, when there is no channel set meeting the requirement on channel quality or no proper channel is selected, the upper node (e.g. CCP) of the BS coordinates the spectrum allocation of each subordinate BS.

Embodiment 2

Figure 4:
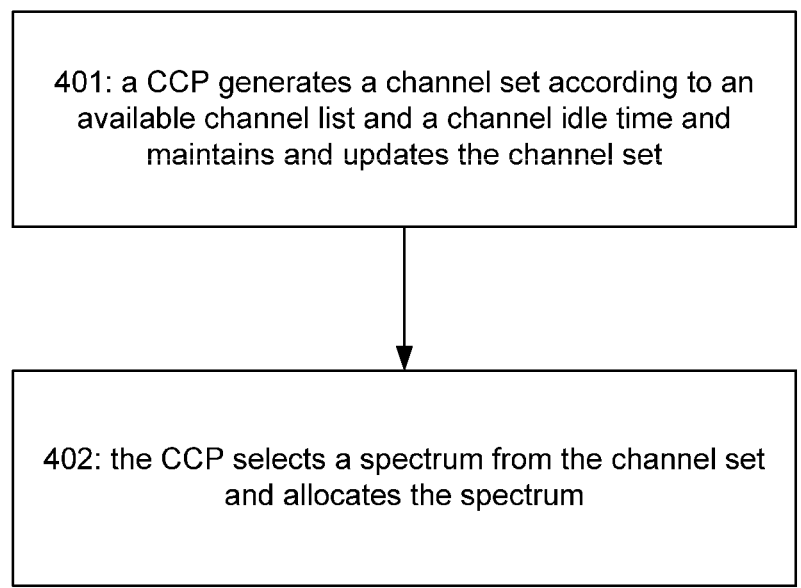
FIG. 4 illustrates the flow of a dynamic spectrum allocation method based on channel management according to embodiment 2.

FIG. 4 illustrates the flow of a dynamic spectrum allocation method based on channel management according to embodiment 2. In the method, a CCP generates a channel set according to an available channel list and a channel idle time. The method includes the following steps:

Step 401: a CCP generates a channel set according to an available channel list and a channel idle time and maintains and updates the channel set.

In this step, the available channel list can be acquired by the CCP from a DB. The acquisition method is the same as that described in Step 301 in embodiment 1 and is therefore not described here repeatedly.

The channel idle time refers to the time span from a specific moment to the moment of the reuse of a channel by a primary system, and the CCP may statistically estimate the channel idle time according to a record on previous channel idle time or acquire the channel idle time from a DB.

The process that the CCP generates a channel set according to an available channel list and a channel idle time specifically includes: dividing the channel idle time into N (N is a positive integer) ranges and dividing the available channel list into N channel sets according to the ranges the channel idle time of the channels in the available channel list belong to, for example, the CCP divides the channel idle time into N ranges: $(-\infty, T_1)1, [T_1, T_2)2, \ldots, [T_{N-1}, +\infty)N$, in which $T_1<T_2<T_3\ldots<T_{N-1}$, if the channel idle time of a channel in the available channel list belongs to the Kth set $[T_{k-1}, T_k)k$, then the channel belongs to the channel set k.

Preferably, each BS corresponds to N channel sets.

Preferably, the channel idle time is divided into two ranges, that is, a channel idle time threshold is determined, the channels in the available channel list the channel idle time of which is below the threshold form a channel set 1, and the channels in the available channel list the channel idle time of which is greater than or equal to the threshold form a channel set 2, for example, assume that the channel idle time threshold is 2 minutes, if the channel idle time of a channel in the available channel list belongs to $(-\infty, 2)1$, then the channel belongs to the channel set 1, and if the channel idle time of a channel in the available channel list belongs to $[2, +\infty)2$, then the channel belongs to the channel set 2.

Preferably, the CCP also ranks the priorities of the channels in the channel set according to the channel quality status and/or the priorities of the channels in an adjacent BS channel set. Specifically, the higher the quality of a channel is, the higher the priority of the channel is; the higher the priority of a channel in an adjacent BS channel set is, the lower the priority of the channel in the current BS is.

Maintaining and updating the channel set specifically includes: the CCP maintains and updates the channel set periodically or under the trigger of an event according to a spectrum sensing measurement result and/or DB information and/or REM information and/or a command from a monitoring domain. The maintenance and update includes: deleting a channel not meeting a channel set condition or adding a channel meeting a channel set condition to a channel set; specifically, taking the generation of two channels as an example, assume that before an update, the channel set 1 is {channel 1, channel 2}, the channel set 2 is {channel 3, channel 4} and the channel idle time of channels 1 to 4 is 1.5 min, 1 min, 3.5 min and 3 min and then changed to 1.6 min, 3.7 min, 2 min and 3 min, after the update, the channel set 1 becomes {channel 1} and the channel set 2 becomes {channel 2, channel 3, channel 4}. Assume the SNRs representing the channel quality of the channels 1 to 4 are 30 dB, 32 dB, 25 dB and 30 dB, after the priority of each channel in the channel set is ranked according to the SNR of the channel, the final obtained channel set 1 is {channel 1} and the final obtained channel set 2 is {channel 2, channel 4, channel 3}.

The command from a monitoring domain refers to a command sent from the monitoring domain to a cognitive system to indicate an exit from a given frequency band, when the monitoring domain reserves a certain or some frequency bands for a certain service according to a temporary planning or when the cognitive system is forbidden to use a certain or some frequency bands due to local regulations, the monitoring domain needs to send a command to the cognitive system to inform the cognitive system to exit the certain frequency band.

Step 402: the CCP selects a spectrum from the channel set and allocates the spectrum.

The event triggering the allocation of a spectrum includes one or more of the following situations: a primary user appears on the idle spectrum of the primary system being used by the CR system; the use of the idle spectrum of the primary system by the CR system causes interference to the primary user; a command is received from the monitoring domain which indicates an exit from an idle spectrum being used by the CR system; and the current load of the CR system is heavy or the communication quality of the CR system is poor.

When any of the foregoing cases occurs, the CCP allocates a spectrum specifically in the following way: the BS applies for a spectrum from the CCP according to the requirement thereof on channel idle time, the CCP selects a channel from a channel set meeting the requirement on channel idle time and allocates the channel to the BS, specifically, by taking the generation of two channel sets as an example, when the BS needs to provide a service required to have a long idle time, for example, a service the idle time of which is longer than or equal to 2 minutes, then the CCP selects a channel starting from the channels in the channel set 2 higher in priority, and when the BS needs to provide a service not required to have a long idle time, the CCP selects a channel from the channel set 1.

Preferably, when there is no channel set meeting the requirement on channel idle time requirement or no proper channel is selected, the upper node (e.g. CCP) of the BS coordinates the spectrum allocation of each subordinate BS.

Embodiment 3

Figure 5:
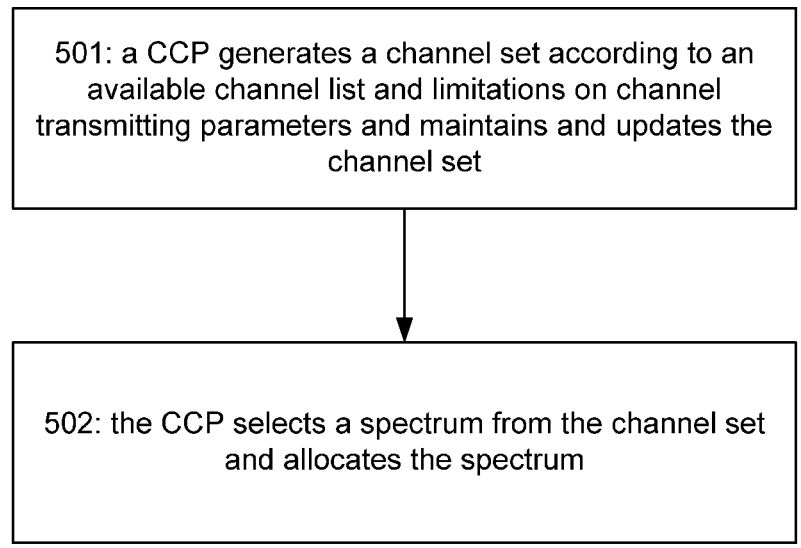
FIG. 5 illustrates the flow of a dynamic spectrum allocation method based on channel management according to embodiment 3.

FIG. 5 illustrates a dynamic spectrum allocation method based on channel management according to embodiment 3, in the method, a CCP generates a channel set according to an available channel list and the limitations on channel transmitting parameters. The method includes the following steps:

Step 501: a CCP generates a channel set according to an available channel list and limitations on channel transmitting parameters and maintains and updates the channel set.

In this step, the available channel list can be acquired by the CCP from a DB. The acquisition method is the same as that described in Step 301 in embodiment 1 and is therefore not described here repeatedly.

The limitations on channel transmitting parameters include the limitation on one or more of the following items: maximum transmitting power, adjacent channel leakage power ratio, stray radiation and maximum channel-allowed interference level;

The limitation on the maximum transmitting power, the limitation on an adjacent channel leakage power ratio and the limitation on stray radiation, which refer to upper limits of radio frequency parameters, that is, corresponding maximum transmitting power, adjacent channel leakage power ratio and spray radiation, of a secondary system when the secondary system uses an idle channel of a primary system, can be calculated by a DB and acquired by a network node from the DB or calculated by a network node; the limitation on the maximum channel-allowed interference level refers to the upper limit of an interference level allowable to the primary system when the secondary system uses an idle channel of the primary system and can be acquired from a DB by a network node.

The process that the CCP generates a channel set according to an available channel list and limitations on channel transmitting parameters specifically includes: by taking the limitation on the maximum transmitting power in the limitations on channel transmitting parameters as an example, dividing the maximum allowable transmitting power of a channel into N ranges (N is a positive integer), and dividing the available channel list into N channel sets according to the ranges the maximum allowable transmitting power of the channels in the available channel list belong to, for example, dividing the maximum allowable transmitting power into N ranges: $(-\infty, P_1)1, [P_1, P_2)2, \ldots, [P_{N-1}, +\infty)N$, in which $P_1<P_2<P_3 \ldots <P_{N-1}$, if the maximum allowable transmitting power of a channel in the available channel list belongs to the kth set $[P_{k-1}, P_k)k$, then the channel belongs to the channel set K; similar to the generation of a channel set according to an available channel list and the limitation on the maximum allowable transmitting power, the generation of a channel set according to an available channel list and the limitation on the adjacent channel leakage power ratio limitation, the limitation on spray radiation or the limitation on the maximum channel-allowed interference level is not described here repeatedly.

Preferably, each BS corresponds to N channel sets.

Preferably, the maximum channel-allowed transmitting power is divided into two ranges, that is, a maximum channel-allowed transmitting power threshold is determined, the channels in the available channel list the maximum allowable transmitting power of which is below the threshold form a channel set 1, and the channels in the available channel list the maximum allowable transmitting power of which is greater than or equal to the threshold form a channel set 2, for example, assume that the maximum channel-allowed transmitting power threshold is 45 dBm, if the maximum allowable transmitting power of a channel in the available channel list belongs to $(-\infty, 45$ dBm$)1$, then the channel belongs to the channel set 1, and if the maximum allowable transmitting power of a channel in the available channel list belongs to $[45$ dBm$, +\infty)2$, then the channel belongs to the channel set 2.

Preferably, the CCP also ranks the priorities of the channels in the channel set according to the channel quality status and/or the priorities of the channels in an adjacent BS channel set. Specifically, the higher the quality of a channel is, the higher the priority of the channel is; the higher the priority of a channel in an adjacent BS channel set is, the lower the priority of the channel in the current BS is.

Maintaining and updating the channel set specifically includes: the CCP maintains and updates the channel set periodically or under the trigger of an event according to a spectrum sensing measurement result and/or DB information and/or REM information and/or a command from a monitoring domain. The maintenance and update includes: deleting a channel not meeting a channel set condition or adding a channel meeting a channel set condition to a channel set; specifically, taking the generation of two channels as an example, assume that before an update, the channel set 1 is {channel 1, channel 2}, the channel set 2 is {channel 3, channel 4} and the maximum allowable transmitting power of channels 1 to 4 is 40 dBm, 44 dBm, 45 dBm and 48 dBm and then changed to 40 dBm, 47 dBm, 45 dBm and 44 dBm, after the update, the channel set 1 becomes {channel 1, channel 4} and the channel set 2 becomes {channel 2, channel 3}. Assume the SNRs representing the channel quality of the channels 1 to 4 are 30 dB, 32 dB, 25 dB and 31 dB, after the priority of each channel in the channel set is ranked according to the SNR of the channel, the final obtained channel set 1 is {channel 4, channel 1} and the final obtained channel set 2 is {channel 2, channel 3}.

The command from a monitoring domain refers to a command sent from the monitoring domain to a cognitive system to indicate an exit from a given frequency band, when the monitoring domain reserves a certain or some frequency bands for a certain service according to a temporary planning or when the cognitive system is forbidden to use a certain or some frequency bands due to local regulations, the monitoring domain needs to send a command to the cognitive system to inform the cognitive system to exit the certain frequency band.

Step 502: the CCP selects a spectrum from the channel set and allocates the spectrum.

The event triggering the allocation of a spectrum includes one or more of the following situations: a primary user appears on the idle spectrum of the primary system being used by the CR system; the use of the idle spectrum of the primary system by the CR system causes interference to the primary user; a command is received from the monitoring domain which indicates an exit from an idle spectrum being used by the CR system; and the current load of the CR system is heavy or the communication quality of the CR system is poor.

When any of the foregoing cases occurs, the CCP allocates a spectrum specifically in the following way: the BS applies for a spectrum from the CCP according to the requirement thereof on an item of channel transmitting parameters, the CCP selects a channel from a channel set meeting the requirement on the item of channel transmitting power parameters and allocates the channel to the BS, specifically, by taking the generation of two channel sets as an example, when the BS requires the maximum transmitting power of a channel to be greater than or equal to 45 dBm, the CCP selects a channel starting from the channels in the channel set 2 higher in priority, and when the BS requires the maximum transmitting power of a channel to be lower than 45 dBm, the CCP selects a channel from the channel set 1.

Preferably, when there is no channel set meeting the requirement of the BS on transmitting power or no proper channel is selected, the upper node (e.g. CCP) of the BS coordinates the spectrum allocation of each subordinate BS.

Embodiment 4

Figure 6:
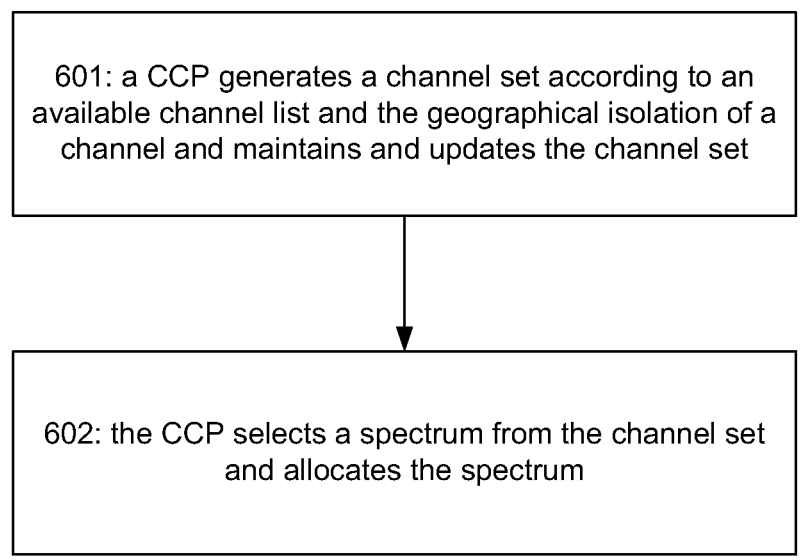
FIG. 6 illustrates the flow of a dynamic spectrum allocation method based on channel management according to embodiment 4.

FIG. 6 illustrates a dynamic spectrum allocation method based on channel management according to embodiment 4, in the method, a CCP generates a channel set according to an available channel list and the geographical isolation of a channel. The method includes the following steps:

Step 601: a CCP generates a channel set according to an available channel list and the geographical isolation of a channel and maintains and updates the channel set.

In this step, the available channel list can be acquired by the CCP from a DB. The acquisition method is the same as that described in Step 301 in embodiment 1 and is therefore not described here repeatedly.

The geographical isolation of a channel refers to the natural isolator existing in a radio environment and/or the distance between the transmitter of a secondary system and the coverage edge of a primary system, and the CCP acquires the geographical isolation of a channel from a DB or REM information.

The process that the CCP generates a channel set according to an available channel list and the geographical isolation of a channel specifically includes: by taking the geographical isolation of a channel being the natural isolator existing in a radio environment as an example, dividing the loss of a radio signal resulting from the passing through a high building or mountain when a secondary system uses an idle spectrum of a primary system into N (N is a positive integer) ranges, dividing the available channel list into N channel sets according to the ranges the passing loss of a channel in the channel list belongs to, for example, dividing the passing loss into N ranges: $(-\infty, L_1)1, [L_1, L_2)2, \ldots, [L_{N-1}, +\infty)N$, in which $T_1 < T_2 < T_3 \ldots < T_{N-1}$, if the geographical isolation of a channel in the available channel list belongs to the Kth set $[[P_{k-1}, P_k)k$, then the channel belongs to the channel set k.

Preferably, each BS corresponds to N channel sets.

Preferably, the geographical isolation of a channel is divided into two ranges, that is, a threshold is determined for the geographical isolation of a channel, the channels in the available channel list the geographical isolation of which is below the threshold form a channel set 1, and the channels in the available channel list the geographical isolation of which is greater than or equal to the threshold form a channel set 2, for example, assume that the passing loss threshold of a channel is 20 dB, if the passing loss of a channel in the available channel list belongs to $(-\infty, 20 \text{ dB})1$, then the channel belongs to the channel set 1, and if the passing loss of a channel in the available channel list belongs to $[20 \text{ dB}, +\infty)2$, then the channel belongs to the channel set 2.

Preferably, the CCP also ranks the priorities of the channels in the channel set according to the channel quality status and/or the priorities of the channels in an adjacent BS channel set. Specifically, the higher the quality of a channel is, the higher the priority of the channel is; the higher the priority of a channel in an adjacent BS channel set is, the lower the priority of the channel in the current BS is.

Maintaining and updating the channel set specifically includes: the CCP maintains and updates the channel set periodically or under the trigger of an event according to a spectrum sensing measurement result and/or DB information and/or REM information and/or a command from a monitoring domain. The maintenance and update includes: deleting a channel not meeting a channel set condition or adding a channel meeting a channel set condition to a channel set; specifically, taking the generation of two channels as an example, assume that before an update, the channel set 1 is {channel 1, channel 2} and the channel set 2 is {channel 3, channel 4} and the passing losses of channels 1 to 4 are 12 dB, 18 dB, 20 dB and 25 dB and then changed to 20 dB, 18 dB, 18 dB and 25 dB, after the update, the channel set 1 becomes {channel 2, channel 3} and the channel set 2 becomes {channel 1, channel 4}. Assume the SNRs representing the channel quality of the channels 1 to 4 are 30 dB, 32 dB, 25 dB and 31 dB, after the priority of each channel in the channel set is ranked according to the SNR of the channel, the final obtained channel set 1 is {channel 2, channel 3} and the finally obtained channel set 2 is {channel 4, channel 1}.

The command from a monitoring domain refers to a command sent from the monitoring domain to a cognitive system to indicate an exit from a given frequency band, when the monitoring domain reserves a certain or some frequency bands for a certain service according to a temporary planning or when the cognitive system is forbidden to use a certain or some frequency bands due to local regulations, the monitoring domain needs to send a command to the cognitive system to inform the cognitive system to exit the certain frequency band.

Step 602: the CCP selects a spectrum from the channel set and allocates the spectrum.

The event triggering the allocation of a spectrum includes one or more of the following situations: a primary user appears on the idle spectrum of the primary system being used by the CR system; the use of the idle spectrum of the primary system by the CR system causes interference to the primary user; a command is received from the monitoring domain which indicates an exit from an idle spectrum being used by the CR system; and the current load of the CR system is heavy or the communication quality of the CR system is poor.

When any of the foregoing cases occurs, the CCP allocates a spectrum specifically in the following way: the BS applies for a spectrum from the CCP according to the requirement thereof on the geographical isolation of a channel, the CCP selects a channel from a channel set meeting the requirement on the geographical isolation of a channel and allocates the channel to the BS, specifically, by taking the generation of two channel sets as an example, when the BS requires the geographical isolation of a channel to be greater than or equal to 20 dB, the CCP selects a channel starting from the channels in the channel set 2 higher in priority, and when the BS requires the geographical isolation of a channel to be lower than 20 dB, the CCP selects a channel from the channel set 1.

Preferably, when there is no channel set meeting the requirement of the BS on the geographical isolation of a channel or no proper channel is selected, the upper node (e.g. CCP) of the BS coordinates the spectrum allocation of each subordinate BS.

Embodiment 5

Figure 7:
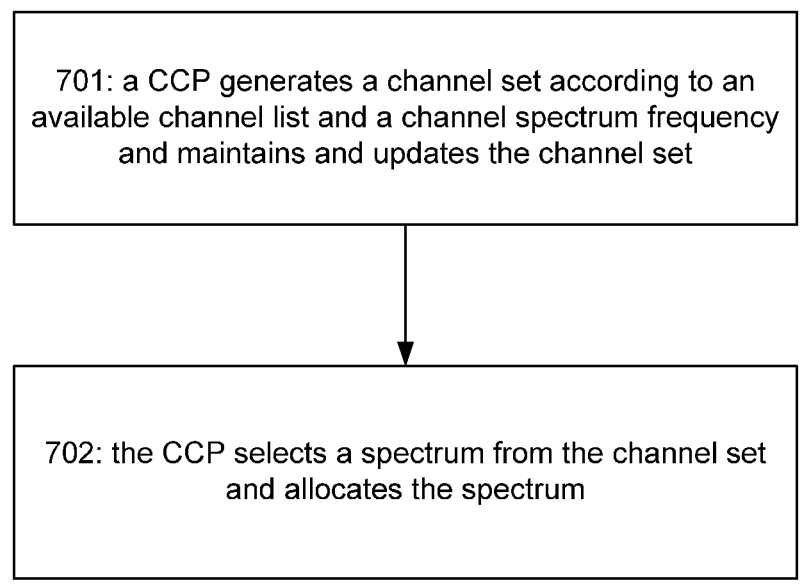
FIG. 7 illustrates the flow of a dynamic spectrum allocation method based on channel management according to embodiment 5.

FIG. 7 illustrates a dynamic spectrum allocation method based on channel management according to embodiment 5. In the method, a CCP generates a channel set according to an available channel list and a channel spectrum frequency. The method includes the following steps:

Step 701: a CCP generates a channel set according to an available channel list and a channel spectrum frequency and maintains and updates the channel set.

In this step, the available channel list can be acquired by the CCP from a DB. The acquisition method is the same as that described in Step 301 in embodiment 1 and is therefore not described here repeatedly.

The channel spectrum frequency refers to the start frequency, the stop frequency or the center frequency of a channel spectrum, and the CCP acquires the channel spectrum frequency from a DB.

The process that the CCP generates a channel set according to an available channel list and a channel spectrum frequency specifically includes: dividing the channel spectrum frequency into N (N is a positive integer) ranges and dividing the available channel list into N channel sets according to the ranges the channel spectrum frequency of the channels in the available channel list belong to, for example, the CCP divides the channel spectrum frequency into N ranges: $(-\infty, F_1)1$, $[F_1, F_2)2, \ldots, [F_{N-1}, +\infty)N$, in which $F_1 < F_2 < F_3 \ldots < F_{N-1}$, if the channel spectrum frequency of a channel in the available channel list belongs to the Kth set $[F_{k-1}, F_k)k$, then the channel belongs to the channel set k.

Preferably, each BS corresponds to N channel sets.

Preferably, the channel spectrum frequency is divided into two ranges, that is, a channel spectrum frequency threshold is determined, the channels in the available channel list the channel spectrum frequency of which is below the threshold form a channel set 1, and the channels in the available channel list the channel spectrum frequency of which is greater than or equal to the threshold form a channel set 2, for example, assume that the channel spectrum frequency threshold is 500 MHz, if the channel spectrum frequency of a channel in the available channel list belongs to $(-\infty, 500 \text{ MHz})1$, then the channel belongs to the channel set 1, and if the channel spectrum frequency of a channel in the available channel list belongs to $[500 \text{ MHz}, +\infty)2$, then the channel belongs to the channel set 2.

Preferably, the CCP also ranks the priorities of the channels in the channel set according to the channel quality status and/or the priorities of the channels in an adjacent BS channel set. Specifically, the higher the quality of a channel is, the higher the priority of the channel is; the higher the priority of a channel in an adjacent BS channel set is, the lower the priority of the channel in the current BS is.

Maintaining and updating the channel set specifically includes: the CCP maintains and updates the channel set periodically or under the trigger of an event according to a spectrum sensing measurement result and/or DB information and/or REM information and/or a command from a monitoring domain. The maintenance and update includes: deleting a channel not meeting a channel set condition or adding a channel meeting a channel set condition to a channel set; specifically, taking the generation of two channels as an example, assume that before an update, the channel set 1 is {channel 1, channel 2}, the channel set 2 is {channel 3, channel 4} and channel spectrum frequencies of channels 1 to 4 are 450 MHz, 480 MHz, 500 MHz and 600 MHz, as the spectrum frequency of a channel is fixed, there is no change in the spectrum frequency of a channel. The update of a channel set is mainly triggered by a change in a factor different from channel spectrum frequency, for example, the reuse of the channel 1 by the primary system or the receiving of a command from a monitoring domain which indicates the prohibition of the use of the channel 1 by a secondary system, in this case, it is needed to delete the channel 1 from the channel set 1. Assume the SNRs representing the channel quality of the channels 2 to 4 are 30 dB, 32 dB and 31 dB, then after the priority of each channel in the channel set is ranked according to the SNR of the channel, the final obtained channel set 1 is {channel 2} and the final obtained channel set 2 is {channel 3, channel 4}.

The command from a monitoring domain refers to a command sent from the monitoring domain to a cognitive system to indicate an exit from a given frequency band, when the monitoring domain reserves a certain or some frequency bands for a certain service according to a temporary planning or when the cognitive system is forbidden to use a certain or some frequency bands due to local regulations, the monitoring domain needs to send a command to the cognitive system to inform the cognitive system to exit the certain frequency band.

Step 702: the CCP selects a spectrum from the channel set and allocates the spectrum.

The event triggering the allocation of a spectrum includes one or more of the following situations: a primary user appears on the idle spectrum of the primary system being used by the CR system; the use of the idle spectrum of the primary system by the CR system causes interference to the primary user; a command is received from the monitoring domain which indicates an exit from an idle spectrum being used by the CR system; and the current load of the CR system is heavy or the communication quality of the CR system is poor.

When any of the foregoing cases occurs, the CCP allocates a spectrum specifically in the following way: the BS applies for a spectrum from the CCP according to the radio transmission environment thereof and the requirement thereof on a radio frequency, the CCP selects a channel from a channel set meeting the requirement of the BS and allocates the channel to the BS, for example, in a rural or suburban area where coverage is given priority by a BS, the CCP usually selects a low-frequency channel, for example, selects from a channel set $(-\infty, \text{MHz})1$, and for an urban area where more buildings are constructed, the CCP selects a high-frequency channel preferentially, for example, selects from a channel set $[500 \text{ MHz}, +\infty)2$.

Preferably, when there is no channel set meeting the requirement of the BS on a channel spectrum frequency or no proper channel is selected, the upper node (e.g. CCP) of the BS coordinates the spectrum allocation of each subordinate BS.

The generation and the maintenance and update of a channel set by a BS and the allocation of a spectrum by the BS are similar to the generation and the maintenance and update of a channel set by a CCP and the allocation of a spectrum by the CCP described in the five embodiments above but different in the acquisition of an available channel list, the selection on a spectrum from a channel set and the allocation of the spectrum. The BS generates a channel set and maintains and updates the channel set in the same way as the CCP.

The BS acquires the available channel list from a DB specifically in the following way:

the BS provides the geographic position information thereof and the identifier information thereof (the radio frequency requirement of the BS, including the minimum transmitting power, the out-of-band radiation and the spray radiation of the BS, can be known according to the identifier information of the BS) to the CCP to which the BS belongs, the CCP sends the information provided by the BS and the identifier thereof to a DB, the DB calculates an available channel list meeting the requirement of the BS according to the geographic position and the identifier information of the BS and feeds back the available channel list to the CCP, and then the CCP obtains the available channel list of the BS according to the available channel lists acquired from the DB and those of other subordinate BSs.

Here, the BS may acquire the available channel list in another way, but is not limited to acquire the available channel list in only one way, for example, the BS provides the geographic position information thereof to the CPP to which the BS belongs, the CCP sends the information provided by the BS and the identifier thereof to a DB, the DB feeds back an available channel list of the BS to the CCP according to the geographic position information of the BS, then the CCP obtains available channel lists of the BS according to the available channel list acquired from the DB and those of other subordinate BSs, and sends the available channel lists of the BS to BS, and the BS selects an available channel list meeting the radio frequency requirement thereof.

In the case where a BS selects a spectrum from a channel set and allocates the spectrum, the BS directly selects a channel from the channel set according to the requirement thereof on a channel, without applying for a spectrum from a CCP.

Specifically, by taking the generation of two channel sets, that is, a channel set 1 (channels the SNR of which belongs to $(-\infty, 30 \text{ dB})1$) and a channel set 2 (channels the SNR of which belongs to $[30 \text{ dB}, +\infty)2$) according to an available channel list and a channel quality status described in embodiment 1 as an example, the BS selects a channel from a channel set meeting the requirement thereof on channel quality, selecting a channel starting from the channel set 2 higher in priority when required to provide a service highly required in QoS, for example, a service the SNR of which is higher than or equal to 30 dB, or from the channel set 1 when required to provide a service not highly required in QoS.

Preferably, when there is no channel set meeting the requirement of the BS on channel quality or no proper channel is selected, the upper node (e.g. CCP) of the BS coordinates the spectrum allocation of each subordinate BS.

It should be noted that the methods described above for generating a channel set may be used in combination to generate a channel set according to an available channel set and two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency. For example, a method for generating a channel set according to an available channel set, a channel quality status and a channel idle time is as follows: in a case where four threshold combinations, that is, channel quality status (<30 dB)+channel idle time (<2 m), channel quality status (<30 dB)+channel idle time (≥2 m), channel quality status (≥30 dB)+channel idle time (<2 m), and channel quality status (≥30 dB)+channel idle time (≥2 m) are obtained when the SNR threshold of the channel quality status is determined to be 30 dB and a channel idle time threshold is determined to be 2 minutes, the available channel list is divided into four channel sets according to the combination of the channel quality status threshold and the channel idle time threshold of a channel in the available channel list belong to, and a proper channel is selected from the channel sets according to the requirement of the BS on the channel quality status and the channel idle time.

Embodiment 6

Based on the embodiments above, the present disclosure also provides an embodiment of a dynamic spectrum allocation device based on channel management which is located at a BS or a CCP and includes:

a channel set generation module configured to generate a channel set according to an available channel list and channel classification information and maintain and update the channel set; and a spectrum allocation module configured to select a spectrum from the channel set and allocate the spectrum.

Preferably, the channel classification information includes one or more of the following items: a channel quality status, a channel idle time, limitations on channel transmitting parameters, the geographical isolation of a channel and a channel spectrum frequency.

The channel quality status is a quantity capable of reflecting the quality of a useful signal received by a receiver when a secondary system uses the idle spectrum of a primary system; and the channel set generation module acquires the channel quality status through the measurement of a secondary device or from REM information.

The channel idle time refers to the time span from a specific moment to the moment of the reuse of a channel by a primary system, and the channel set generation module may statistically estimate the channel idle time according to a record on previous channel idle time or acquire the channel idle time from a DB.

The limitations on channel transmitting parameters include one or more of the following items: a limitation on the maximum transmitting power, a limitation on an adjacent channel leakage power ratio, a limitation on stray radiation and a limitation on the maximum channel-allowed interference level; the limitation on the maximum transmitting power, the limitation on an adjacent channel leakage power ratio and the limitation on stray radiation, which refer to upper limits of corresponding maximum transmitting power, adjacent channel leakage power ratio and spray radiation of a secondary system when the secondary system uses an idle channel of a primary system, can be calculated by a DB and acquired by the channel set generation module from the DB or calculated by the channel set generation module; and the limitation on the maximum channel-allowed interference level refers to the upper limit of an interference level allowable to the primary system when the secondary system uses an idle channel of the primary system and can be acquired the channel set generation module from the DB.

The geographical isolation of a channel refers to the natural isolator existing in a radio environment and/or the distance between the transmitter of the secondary system and the coverage edge of the primary system, and the channel set generation module acquires the geographical isolation of a channel from a DB or REM information.

The channel spectrum frequency refers to the start frequency, the stop frequency or the center frequency of a channel spectrum, and the channel set generation module acquires the channel spectrum frequency from a DB.

Preferably, generating a channel set according to an available channel list and channel classification information specifically includes:

the channel set generation module generates a channel set according to an available channel list and a channel quality status, divides the channel quality status into N ranges, wherein N is a positive integer, and divides the available channel list into N channel sets according to the ranges the channel quality status of the channels in the available channel list belong to; or the channel set generation module generates a channel set according to an available channel list and a channel idle time, divides the channel idle time into N ranges and divides the available channel list into N channel sets according to the ranges the channel idle time of the channels in the available channel list belong to; or the channel set generation module generates a channel set according to an available channel list and the geographical isolation of a channel, divides the geographical isolation of a channel into N ranges, and divides the available channel list into N channel sets according to the ranges the geographical isolation of a channel in the channel available list belong to; or the channel set generation module generates a channel set according to an available channel list and limitations on channel transmitting parameters, divides an item in the limitations on channel transmitting parameters into N ranges, and divides the available channel list into N channel sets according to the ranges the corresponding item in the limitations on channel transmitting parameters of the channels in the available channel list belong to; or the channel set generation module generates a channel set according to an available channel list and a channel spectrum frequency, divides the channel spectrum frequency into N ranges, and divides the available channel list into N channel sets according to the ranges the channel spectrum frequency of the channels in the available channel list belong to; or the channel set generation module generates N channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographical isolation of a channel and a channel spectrum frequency.

Preferably, each BS corresponds to N channel sets.

Preferably, the channel set generation module generates a channel set according to an available channel list and a channel quality status and divides the channel quality status into 2 ranges, that is, determines a channel quality threshold, wherein the channels in the available channel list the channel quality of which is below the threshold form a channel set 1, and the channels in the available channel list the channel quality of which is equal to or greater than the threshold form a channel set 2; or the channel set generation module generates a channel set according to an available channel list and a channel idle time and divides the channel idle time into 2 ranges, that is, determines a channel idle time threshold, wherein the channels in the available channel list the channel idle time of which is below the threshold form a channel set 1, and the channels in the available channel list the channel idle time of which is equal to or greater than the threshold form a channel set 2; or the channel set generation module generates a channel set according to an available channel list and limitations on channel transmitting parameters and divides an item in the limitations on channel transmitting parameters into 2 ranges, that is, determines a threshold for a corresponding item in the limitations on channel transmitting parameters, wherein the channels in the available channel list the corresponding item of which in the limitations on channel transmitting parameters is below the threshold form a channel set 1, and the channels in the available channel list the corresponding item of which in the limitations on channel transmitting parameters is equal to or greater than the threshold form a channel set 2; or the channel set generation module generates a channel set according to an available channel list and the geographical isolation of a channel and divides the geographical isolation of a channel into 2 ranges, that is, determines a threshold for the geographical isolation of a channel, wherein the channels in the available channel list the geographical isolation of which is below the threshold form a channel set 1, and the channels in the available channel list the geographical isolation of which is equal to or greater than the threshold form a channel set 2; or the channel set generation module generates a channel set according to an available channel list and a channel spectrum frequency and divides the channel spectrum frequency into 2 ranges, that is, determines a channel spectrum frequency threshold, wherein the channels in the available channel list the channel spectrum frequency of which is below the threshold form a channel set 1, and the channels in the available channel list the channel spectrum frequency of which is equal to or greater than the threshold form a channel set 2; or the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, determines a threshold for each of the two or more items to obtain threshold combinations of the two or more items, and forms a channel set with the channels in the available channel list belonging to the same threshold combination.

Preferably, the channel set generation module ranks the priorities of the channels in the channel set according to the channel quality status and/or the priorities of the channels in an adjacent BS channel set.

Preferably, when the channel set generation module generates a channel set according to an available channel list and a channel quality status, the spectrum allocation module selects a channel from a channel set meeting the requirement of a BS on channel quality;

when the channel set generation module generates a channel set according to an available channel list and a channel idle time, the spectrum allocation module selects a channel from a channel set meeting the requirement of a BS on channel idle time;

when the channel set generation module generates a channel set according to an available channel list and limitations on channel transmitting parameters, the spectrum allocation module selects a channel from a channel set meeting the requirements of a BS on channel transmitting parameters;

when the channel set generation module generates a channel set according to an available channel list and the geographical isolation of a channel, the spectrum allocation module selects a channel from a channel set meeting the requirement of a BS on the geographical isolation of a channel;

when the channel set generation module generates a channel set according to an available channel list and a channel spectrum frequency, the spectrum allocation module selects a channel from a channel set meeting the requirement of a BS on the channel spectrum frequency; and when the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, the spectrum allocation module selects a channel from a channel set meeting the requirement of a BS on the two or more items.

The mentioned above is merely preferred embodiment of the present disclosure but limitation to the protection scope of the present disclosure, and any modification, substitute or improvement devised without departing from the spirit and scope of the present disclosure should fall within the protection range of the present disclosure.

The invention claimed is:

1. A dynamic spectrum allocation method based on channel management, comprising:

generating, by a network node, a channel set according to an available channel list and channel classification information, and maintaining and updating the channel set; and selecting, by the network node, a spectrum from the channel set and allocating the spectrum;

wherein the channel classification information includes one or more of the following items: a channel quality status, a channel idle time, limitations on channel transmitting parameters, the geographical isolation of a channel and a channel spectrum frequency;

wherein the channel quality status is a quantity capable of reflecting the quality of a useful signal received by a receiver when a secondary system uses the idle spectrum of a primary system;

the channel idle time refers to the time span from a specific moment to the moment of the reuse of a channel by the primary system;

the limitations on channel transmitting parameters include one or more of the following items: a limitation on the maximum transmitting power, a limitation on an adjacent channel leakage power ratio, a limitation on stray radiation and a limitation on the maximum channel-allowed interference level;

the geographical isolation of a channel refers to the natural isolator existing in a radio environment and/or the distance between the transmitter of the secondary system and the coverage edge of the primary system; and the channel spectrum frequency refers to the start frequency, the stop frequency or the center frequency of a channel spectrum.

2. The method according to claim 1, wherein the network node is a base station or a center control point, and in the case where the network node is a center control point, the center control point selects a spectrum from the channel set and allocates the spectrum for the base station.

3. The method according to claim 1, wherein the available channel list is acquired by the network node from a database in which primary user related spectrum information is stored.

4. The method according to claim 1, wherein the limitations on channel transmitting parameters include one or more of the following items: a limitation on the maximum transmitting power, a limitation on an adjacent channel leakage power ratio, a limitation on stray radiation and a limitation on the maximum channel-allowed interference level.

5. The method according to claim 4, wherein generating a channel set according to an available channel list and channel classification information specially comprises:

generating a channel set according to an available channel list and a channel quality status, dividing the channel quality status into N ranges, wherein N is a positive integer, and dividing the available channel list into N channel sets according to the ranges the channel quality status of the channels in the available channel list belong to; or generating a channel set according to an available channel list and a channel idle time, dividing the channel idle time into N ranges, wherein N is a positive integer, and dividing the available channel list into N channel sets according to the ranges the channel idle time of the channels in the available channel list belong to; or generating a channel set according to an available channel list and the geographical isolation of a channel, dividing the geographical isolation of a channel into N ranges, and dividing the available channel list into N channel sets according to the ranges the geographical isolation of a channel in the channel list belong to; or generating a channel set according to an available channel list and limitations on channel transmitting parameters, dividing an item in the limitations on channel transmitting parameters into N ranges, wherein N is a positive integer, and dividing the available channel list into N channel sets according to the ranges the corresponding item in the limitations on channel transmitting parameters of the channels in the available channel list belong to; or generating a channel set according to an available channel list and a channel spectrum frequency, dividing the channel spectrum frequency into N ranges, wherein N is a positive integer, and dividing the available channel list into N channel sets according to the ranges the channel spectrum frequency of the channels in the available channel list belong to; or generating N channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, wherein N is a positive integer.

6. The method according to claim 5, wherein each base station corresponds to N channel sets.

7. The method according to claim 5, wherein step of generating a channel set according to an available channel list and channel classification information specially comprises:

generating a channel set according to an available channel list and a channel quality status, dividing the channel quality status into 2 ranges, that is, determining a channel quality threshold, wherein the channels in the available channel list the channel quality of which is below the threshold form a channel set 1, and the channels in the available channel list the channel quality of which is equal to or greater than the threshold form a channel set 2; or generating a channel set according to an available channel list and a channel idle time, dividing the channel idle time into 2 ranges, that is, determining a channel idle time threshold, wherein the channels in the available channel list the channel idle time of which is below the threshold form a channel set 1, and the channels in the available channel list the channel idle time of which is equal to or greater than the threshold form a channel set 2; or generating a channel set according to an available channel list and limitations on channel transmitting parameters, dividing an item in the limitations on channel transmitting parameters into 2 ranges, that is, determining a threshold for a corresponding item in the limitations on channel transmitting parameters, wherein the channels in the available channel list the corresponding item of which in the limitations on channel transmitting parameters is below the threshold form a channel set 1, and the channels in the available channel list the corresponding item of which in the limitations on channel transmitting parameters is equal to or greater than the threshold form a channel set 2; or generating a channel set according to an available channel list and the geographical isolation of a channel, dividing the geographical isolation of a channel into 2 ranges, that is, determining a threshold for the geographical isolation of a channel, wherein the channels in the available channel list the geographical isolation of which is below the threshold form a channel set 1, and the channels in the available channel list the geographical isolation of which is equal to or greater than the threshold form a channel set 2; or generating a channel set according to an available channel list and a channel spectrum frequency, dividing the channel spectrum frequency into 2 ranges, that is, determining a channel spectrum frequency threshold, wherein the channels in the available channel list the channel spectrum frequency of which is below the threshold form a channel set 1, and the channels in the available channel list the channel spectrum frequency of which is equal to or greater than the threshold form a channel set 2; or generating channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, determining a threshold for each of the two or more items to obtain threshold combinations of the two or more items, and forming a channel set using the channels in the available channel list belonging to the same threshold combination.

8. The method according to claim 1, wherein step of selecting a spectrum from the channel set and allocating the spectrum by the network node specially comprises:

when a channel set is generated according to an available channel list and the channel quality status, selecting a channel from a channel set meeting the requirement of a base station on channel quality;

when a channel set is generated according to an available channel list and the channel idle time, selecting a channel from a channel set meeting the requirement of a base station on channel idle time;

when a channel set is generated according to an available channel list and limitations on channel transmitting parameters, selecting a channel from a channel set meeting the requirement of a base station on channel transmitting parameters;

when a channel set is generated according to an available channel list and the geographical isolation of a channel, selecting a channel from a channel set meeting the requirement of a base station on the geographical isolation of a channel;

when a channel set is generated according to an available channel list and the channel spectrum frequency, selecting a channel from a channel set meeting the requirement of a base station on a channel spectrum frequency; and when a channel set is generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, selecting a channel from a channel set meeting the requirement of a base station on the two or more items.

9. A dynamic spectrum allocation device based on channel management, comprising:

a channel set generation module configured to generate a channel set according to an available channel list and channel classification information, and maintain and update the channel set; and a spectrum allocation module configured to select a spectrum from the channel set and allocate the spectrum;

wherein the channel classification information includes one or more of the following items: a channel quality status, a channel idle time, limitations on channel transmitting parameters, the geographical isolation of a channel and a channel spectrum frequency;

wherein the channel quality status is a quantity capable of reflecting the quality of a useful signal received by a receiver when a secondary system uses the idle spectrum of a primary system;

the channel idle time refers to the time span from a specific moment to the moment of the reuse of a channel by the primary system;

the limitations on channel transmitting parameters include one or more of the following items: a limitation on the maximum transmitting power, a limitation on an adjacent channel leakage power ratio, a limitation on stray radiation and a limitation on the maximum channel-allowed interference level;

the geographical isolation of a channel refers to the natural isolator existing in a radio environment and/or the distance between the transmitter of the secondary system and the coverage edge of the primary system; and the channel spectrum frequency refers to the start frequency, the stop frequency or the center frequency of a channel spectrum.

10. The device according to claim 9, wherein the device is located at a base station or a center control point.

11. The device according to claim 9, wherein the channel set generation module generates a channel set according to an available channel list and a channel quality status and divides the channel quality status into N ranges, wherein N is a positive integer, and dividing the available channel list into N channel sets according to the ranges the channel quality status of the channels in the available channel list belong to; or the channel set generation module generates a channel set according to an available channel list and a channel idle time, divides the channel idle time into N ranges and divides the available channel list into N channel sets according to the ranges the channel idle time of the channels in the available channel list belong to; or the channel set generation module generates a channel set according to an available channel list and the geographical isolation of a channel, divides the geographical isolation of a channel into N ranges, and divides the available channel list into N channel sets according to the ranges the geographical isolation of a channel in the channel list belong to; or the channel set generation module generates a channel set according to an available channel list and limitations on channel transmitting parameters, divides an item in the limitations on channel transmitting parameters into N ranges, and divides the available channel list into N channel sets according to the ranges the corresponding item in the limitations on channel transmitting parameters of the channels in the available channel list belong to; or the channel set generation module generates a channel set according to an available channel list and a channel spectrum frequency, divides the channel spectrum frequency into N ranges, and divides the available channel list into N channel sets according to the ranges the channel spectrum frequency of the channels in the available channel list belong to; or the channel set generation module generates N channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency; wherein N is a positive integer.

12. The method according to claim 11, wherein each base station corresponds to N channel sets.

13. The device according to claim 11, wherein the channel set generation module generates a channel set according to an available channel list and a channel quality status and divides the channel quality status into 2 ranges, that is, determines a channel quality threshold, wherein the channels in the available channel list the channel quality of which is below the threshold form a channel set 1, and the channels in the available channel list the channel quality of which is equal to or greater than the threshold form a channel set 2;

the channel set generation module generates a channel set according to an available channel list and a channel idle time and divides the channel idle time into 2 ranges, that is, determines a channel idle time threshold, wherein the channels in the available channel list the channel idle time of which is below the threshold form a channel set 1, and the channels in the available channel list the channel idle time of which is equal to or greater than the threshold form a channel set 2; or the channel set generation module generates a channel set according to an available channel list and limitations on channel transmitting parameters and divides an item in the limitations on channel transmitting parameters into 2 ranges, that is, determines a threshold for a corresponding item in the limitations on channel transmitting parameters, wherein the channels in the available channel list the corresponding item of which in the limitations on channel transmitting parameters is below the threshold form a channel set 1, and the channels in the available channel list the corresponding item of which in the limitations on channel transmitting parameters is equal to or greater than the threshold form a channel set 2; or the channel set generation module generates a channel set according to an available channel list and the geographical isolation of a channel and divides the geographical isolation of a channel into 2 ranges, that is, determines a threshold for the geographical isolation of a channel, wherein the channels in the available channel list the geographical isolation of which is below the threshold form a channel set 1, and the channels in the available channel list the geographical isolation of which is equal to or greater than the threshold form a channel set 2; or the channel set generation module generates a channel set according to an available channel list and a channel spectrum frequency and divides the channel spectrum frequency into 2 ranges, that is, determines a channel spectrum frequency threshold, wherein the channels in the available channel list the channel spectrum frequency of which is below the threshold form a channel set 1, and the channels in the available channel list the channel spectrum frequency of which is equal to or greater than the threshold form a channel set 2; or the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, determines a threshold for each of the two or more items to obtain threshold combinations of the two or more items, and forms a channel set with the channels in the available channel list belonging to the same threshold combination.

14. The device according to claim 9, wherein the channel set generation module ranks the priorities of the channels in the channel set according to the channel quality status and/or the priorities of the channels in an adjacent base station channel set.

15. The device according to claim 9, wherein
when the channel set generation module generates a channel set according to an available channel list and a channel quality status, the spectrum allocation module selects a channel from the channel set meeting a requirement on channel quality according to the requirement of a base station on channel quality;
when the channel set generation module generates a channel set according to an available channel list and a channel idle time, the spectrum allocation module selects a channel from the channel set meeting a requirement on channel idle time according to the requirement of a base station on channel idle time;
when the channel set generation module generates a channel set according to an available channel list and limitations on channel transmitting parameters, the spectrum allocation module selects a channel from the channel set meeting a requirement on limitations on channel transmitting parameters according to the requirement of a base station on channel transmitting parameter;
when the channel set generation module generates a channel set according to an available channel list and the geographical isolation of a channel, the spectrum allocation module selects a channel from the channel set meeting a requirement on the geographical isolation of a channel according to the requirement of a base station on the geographical isolation of a channel;
when the channel set generation module generates a channel set according to an available channel list and a channel spectrum frequency, the spectrum allocation module selects a channel from a channel set meeting the requirement of a base station on channel spectrum frequency; and
when the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, the spectrum allocation module selects a channel from a channel set meeting the requirement of a base station the two or more items.

16. The method according to claim 5, wherein step of selecting a spectrum from the channel set and allocating the spectrum by the network node specially comprises:
when a channel set is generated according to an available channel list and the channel quality status, selecting a channel from a channel set meeting the requirement of a base station on channel quality;
when a channel set is generated according to an available channel list and the channel idle time, selecting a channel from a channel set meeting the requirement of a base station on channel idle time;
when a channel set is generated according to an available channel list and limitations on channel transmitting parameters, selecting a channel from a channel set meeting the requirement of a base station on channel transmitting parameters;
when a channel set is generated according to an available channel list and the geographical isolation of a channel, selecting a channel from a channel set meeting the requirement of a base station on the geographical isolation of a channel;
when a channel set is generated according to an available channel list and the channel spectrum frequency, selecting a channel from a channel set meeting the requirement of a base station on a channel spectrum frequency; and
when a channel set is generated according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, selecting a channel from a channel set meeting the requirement of a base station on the two or more items.

17. The device according to claim 11, wherein
when the channel set generation module generates a channel set according to an available channel list and a channel quality status, the spectrum allocation module selects a channel from the channel set meeting a requirement on channel quality according to the requirement of a base station on channel quality;
when the channel set generation module generates a channel set according to an available channel list and a channel idle time, the spectrum allocation module selects a channel from the channel set meeting a requirement on channel idle time according to the requirement of a base station on channel idle time;
when the channel set generation module generates a channel set according to an available channel list and limitations on channel transmitting parameters, the spectrum allocation module selects a channel from the channel set meeting a requirement on limitations on channel transmitting parameters according to the requirement of a base station on channel transmitting parameter;
when the channel set generation module generates a channel set according to an available channel list and the geographical isolation of a channel, the spectrum allocation module selects a channel from the channel set meeting a requirement on the geographical isolation of a channel according to the requirement of a base station on the geographical isolation of a channel;
when the channel set generation module generates a channel set according to an available channel list and a channel spectrum frequency, the spectrum allocation module selects a channel from a channel set meeting the requirement of a base station on channel spectrum frequency; and
when the channel set generation module generates channel sets according to an available channel list and any two or more items of a channel quality status, a channel idle time, a limitation on the maximum transmitting power, a limitation on an adjacent channel leakage power ratio, a limitation on stray radiation, a limitation on the maximum channel-allowed interference level, the geographic isolation of a channel and a channel spectrum frequency, the spectrum allocation module selects a channel from a channel set meeting the requirement of a base station the two or more items.

* * * * *